United States Patent
Corghi

(12) United States Patent (10) Patent No.: US 6,516,855 B2
Corghi (45) Date of Patent: Feb. 11, 2003

(54) WHEEL RIM LOCKING DEVICE FOR TIRE REMOVAL MACHINES

(75) Inventor: Remo Corghi, Correggio (IT)

(73) Assignee: RGHI S.p.A., Reggio Emilia (IT)

( * ) Notice: Subject to any disclaimer, the term of this patent is extended or adjusted under 35 U.S.C. 154(b) by 0 days.

(21) Appl. No.: 09/843,698

(22) Filed: Apr. 30, 2001

(65) Prior Publication Data

US 2001/0042602 A1 Nov. 22, 2001

(30) Foreign Application Priority Data

May 22, 2000 (IT) ........................................ RE00A0051

(51) Int. Cl.[7] ................................................. B60B 30/00
(52) U.S. Cl. .............................. 157/14; 157/21; 157/1.1
(58) Field of Search .............................. 157/14, 21, 1.1, 157/1.17

(56) References Cited

U.S. PATENT DOCUMENTS

| | | | | |
|---|---|---|---|---|
| 2,895,519 A | * | 7/1959 | Coats | ........................... 157/14 |
| 4,202,213 A | * | 5/1980 | Toriselli | ....................... 73/487 |
| 5,074,347 A | * | 12/1991 | Corghi | ........................ 157/14 |
| 5,232,035 A | * | 8/1993 | Adams, Jr. | .................... 157/14 |
| 5,337,817 A | * | 8/1994 | Steinbeck et al. | ............ 157/21 |
| 5,615,574 A | * | 4/1997 | Drechsler et al. | ............. 157/14 |

FOREIGN PATENT DOCUMENTS

IT 224593 4/1991

OTHER PUBLICATIONS

Abstract of the German Patent No. DE 4209932.

* cited by examiner

*Primary Examiner*—Eileen P. Morgan
*Assistant Examiner*—Joni B. Danganan
(74) *Attorney, Agent, or Firm*—Browdy and Neimark

(57) ABSTRACT

A wheel rim locking device for tire removal machines, comprising, for supporting the wheel rim, an upper plate provided with an axial hole and supported at the top of a hollow vertical rotary shaft, conical means to be inserted axially into said hole and into the cavity of said shaft to lock the wheel rim in a centered position, means driving said conical means towards the wheel rim and axially locking them, and means for rotatably locking said hollow shaft relative to said wheel rim.

7 Claims, 2 Drawing Sheets

WHEEL RIM LOCKING DEVICE FOR TIRE REMOVAL MACHINES

BACKGROUND OF THE INVENTION

1. Technical Field of the Invention

This invention relates to a self-centering device for locking the wheel rim for the purpose of mounting or removing its tyre.

2. Prior Art

To lock the wheel rim in the working position, tyre removal machines are currently provided with suitable devices, known as self-centering devices, which generally comprise a circular plate provided with a series of radial grooves within which sliding blocks having locking heads (fasteners) which lock the wheel rim in the working position are made to slide. The locking heads, generally four in number, are equidistant about a circumference, and are of the double acting radial sliding type, in order to be able to grip the wheel rim both from the outside and from the inside.

The circular plate is rotated about itself by a coaxial shaft driven by a suitable motor unit.

The sliding blocks are caused to slide within the grooves by a double-acting cylinder-piston unit positioned coaxial to the shaft and acting on levers connected to the sliding blocks, as described in greater detail in Italian utility model No. 224593 in the name of the same Applicant.

In mounting or removing a tyre onto or from the wheel rim, only one side of the tyre at a time can be operated on, i.e. after operating on one side of the wheel rim, this has to be rotated through 180°.

This both demands physical force from the operator and results in an extension of the operating time.

On the other hand, those systems which lock the wheel at the hub, and which allow access to both sides of the wheel at the same time, present the drawback of insecure wheel locking against rotation, which is often precarious.

OBJECT AND SUMMARY OF THE INVENTION

The object of the invention is to overcome the drawbacks of the known art within the framework of a rational and reliable solution.

The invention attains said object by providing a device for locking the wheel rim at the hub, comprising means for rotating the wheel even if considerable tangential resistance forces are present.

BRIEF DESCRIPTION OF THE DRAWINGS

The constructional and operational characteristics of the invention are highlighted in the ensuing detailed description, given with reference to the accompanying figures, in which.

DETAILED DESCRIPTION OF THE PREFERRED EMBODIMENT(S) OF THE INVENTION

The aforestated figures show the device 1 for supporting and locking the wheel rim 2.

The device comprises a shaft 3 rotated by known means, not shown, and which projects from the base 4 of the tyre removal machine, also not shown.

Figure 1:
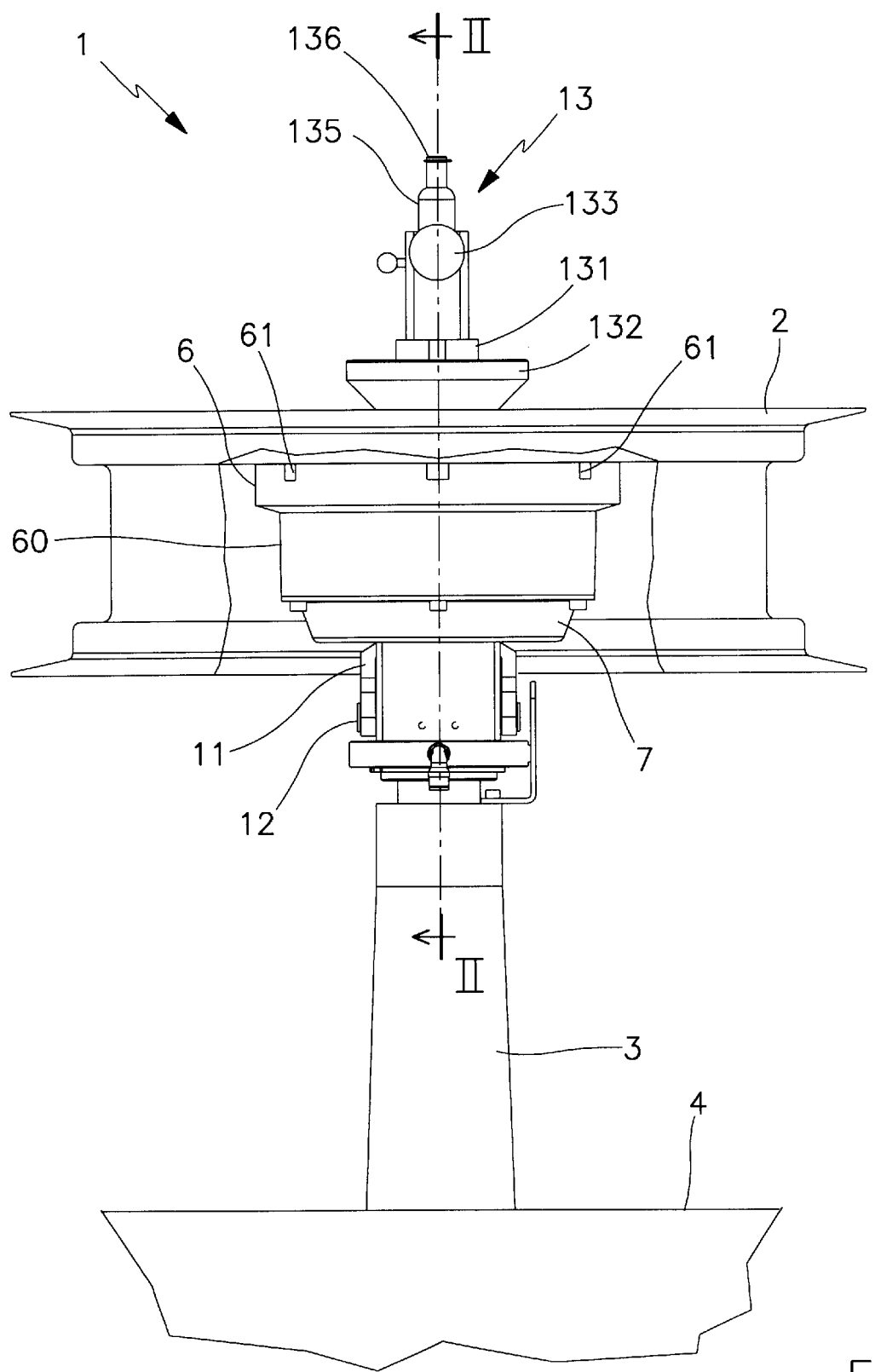
FIG. 1 is a side view of the invention.
Figure 2:
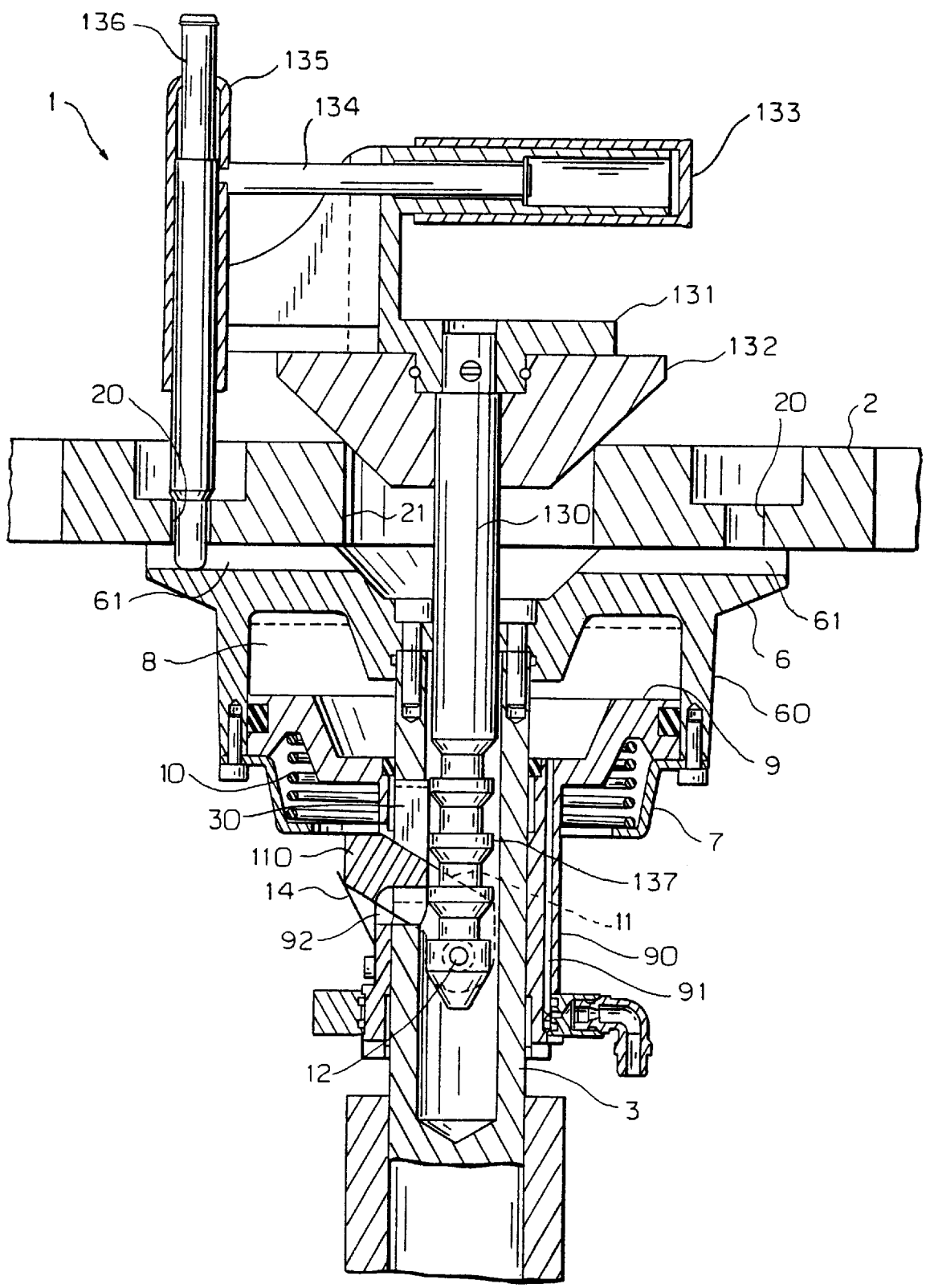
FIG. 2 is a section on the line II—II of FIG. 1.

With reference to FIG. 2, the shaft 3 supports at its upper end a circular plate 6, on which the wheel rim 2 is rested.

The plate 6 is provided with an axial hole and six equidistant radial grooves 61.

The plate 6 is also provided with an annular descending lower skirt 60, to the free end of which there is fixed a cover 7 which, together with said skirt 60, defines a chamber 8.

Within the chamber 8 there sealedly slides an annular piston 9, provided with a rod 90 sealedly mounted about the shaft 3.

A part of the shaft 3 is axially hollow, the cavity being of hexagonal cross-section.

Within the wall of the hollow rod 90 there is present a conduit 91 through which a pressurized fluid is fed above the piston 9.

Between said piston 9 and said cover 7 there is interposed a spring 10 which maintains the piston 9 urged upwards.

The rod 90 of the piston 9 comprises a U-shaped external pawl 11, which rocks about two externally projecting diametrical pins 12 on rod 90, and is provided with a central tooth 110 which enters the interior of said hollow shaft 3 via apertures 30 and 92, by passing through said rod.

A bar 130, of hexagonal cross-section, pertaining to a device 13 for locking the wheel rim 2 in the working position is received in the interior of said hollow shaft 3.

The bar 130 comprises annular projections 137 which are upperly flat and lowerly conical, so that when the bar is inserted into the hollow shaft 3 the conical part of the projections engages the central tooth 110 which causes the pawl 11 to rotate against the action of a leaf spring 14, while at the same time the bar is unable to be withdrawn after an annular projection passes below the central tooth 110 because the leaf spring maintains the central tooth 110 on the upper flat surface of said projections 137.

The bar 130 is inserted into the hollow shaft 3 until the cone 132 encounters the outer hub 21 of the wheel rim 6.

The device 13 comprises an upper member 131 from which said bar 130 descends and to which a locking cone 132 coaxial with said bar 130 is fixed.

The member 131 also comprises a handle 133 within which there slides a bar 134, the free end of which carries a vertical sleeve 135 within which a second bar 136 slides.

When the wheel rim 2 is in position, the bar 130 is inserted into said hollow shaft 3, and the second bar 136 is positioned in one of the holes 20 by which the wheel rim 2 is fixed to the vehicle.

The hexagonal cross-section of the bar 130 and of the cavity of the shaft 3 ensure that the lower end of the bar 136 lies in one of the six radial grooves 61 present in the circular plate 6.

In this manner by lowering the bar 136, this becomes secured both to the bar 130 and to the plate 6, and can exert a large force to cause the wheel rim to rotate without undergoing deformation.

With the device rotatably blocked, compressed air is fed through the conduit 91 and the piston 9 descends against the action of the spring 10.

The descent of the piston also determines the lowering of the pawl 11, the tooth 110 of which rests against the flat upper surface of one of the annular projections 137, and remains locked in position by the action exerted by the leaf spring 14.

In this manner, the wheel rim 2 becomes definitively locked in the working position.

When the tyre has been mounted on or removed from the wheel rim 2, the wheel rim is released by simply discharging the compressed air so that the spring 10 raises the piston 9 and the pawl 11, so that this disengages from the annular projection 137.

What is claimed is:

1. A wheel rim locking device for tyre removal machines, comprising an upper plate provided with an axial hole supported at the top of a hollow rotary shaft, locking means to be inserted axially through said hole into said hollow rotary shaft to axially lock the wheel rim in a centered position on said upper plate, and means for rotatably locking said hollow rotary shaft relative to said wheel rim.

2. A device as claimed in claim 1 wherein said locking means comprise an axial cone with a bar provided with annular projections and insertable into said hollow rotary shaft, within which said annular projections engage a pawl which can be laterally inserted into an interior of said hollow rotary shaft, and means for causing said pawl to move axially relative to said hollow rotary shaft, to lock said cone against said wheel rim.

3. A device as claimed in claim 2, wherein the upper plate of the hollow rotary shaft comprises a descending cylindrical skirt, an annular piston slidably engaged within the cylindrical skirt provided with a hollow rod positioned about the outside of said hollow rotary shaft, said hollow rod being provided with an aperture through which said pawl acts, in a position corresponding with the aperture there being located in a wall of the hollow rotary shaft an opening through which said pawl comes into contact with the annular projections of the bar carrying the axial cone.

4. A device as claimed in claim 3, wherein a conduit which feeds compressed air onto the piston is provided within a wall of the hollow rod of the piston.

5. A device as claimed in claim 1, wherein the upper plate is provided with radial grooves, a lower end of a locking bar slidable in one of the radial grooves parallel to an axis of the upper plate within a seat fixed to the axial cone, said locking bar being inserted into one of holes in the wheel rim which receive the wheel rim fixing bolts.

6. A device as claimed in claim 5, wherein the bar is coaxial with the axial cone, and the hollow rotary shaft and the bar have matching polygonal cross-sections so as to be rotatably locked together.

7. A device as claimed in claim 6, wherein the polygonal cross-section has a number of sides equal to the number of grooves in the upper plate.

* * * * *

UNITED STATES PATENT AND TRADEMARK OFFICE
CERTIFICATE OF CORRECTION

PATENT NO.      : 6,516,855 B2
DATED           : February 11, 2003
INVENTOR(S)     : Remo Corghi It is certified that error appears in the above-identified patent and that said Letters Patent is hereby corrected as shown below:

<u>Title page,</u>
Item [73], delete "RGHI" and insert therefor -- CORGHI --.

Signed and Sealed this

Fifteenth Day of July, 2003

JAMES E. ROGAN
*Director of the United States Patent and Trademark Office*